United States Patent [19]

Sami

[11] 4,071,859
[45] Jan. 31, 1978

[54] TAPE CARTRIDGE POSITIONING AND EJECTION DEVICE

[75] Inventor: Yasuo Sami, Moriguchi, Japan

[73] Assignee: Sanyo Electric Co., Ltd., Osaka, Japan

[21] Appl. No.: 714,233

[22] Filed: Aug. 13, 1976

[30] Foreign Application Priority Data
Aug. 19, 1975 Japan .......................... 50-115527[U]
Oct. 16, 1975 Japan .......................... 50-141311[U]

[51] Int. Cl.² ...................... G11B 15/66; G11B 21/22
[52] U.S. Cl. .................................... 360/96; 360/105
[58] Field of Search ................. 360/96, 93, 105, 137

[56] References Cited
U.S. PATENT DOCUMENTS

| | | | |
|---|---|---|---|
| 3,882,542 | 5/1975 | Nakamichi | 360/96 |
| 3,987,486 | 10/1976 | Ito et al. | 360/96 |
| 3,996,618 | 12/1976 | Suzuki | 360/96 |

*Primary Examiner*—Robert S. Tupper
*Attorney, Agent, or Firm*—Armstrong, Nikaido & Marmelstein

[57] ABSTRACT

A tape cartridge positioning and ejection device for use in a magnetic tape recording and reproduction apparatus in which a rack and pinion combination is employed for positioning of the tape cartridge in the correct recording and reproduction position upon insertion and for ejection of the same when necessary in an efficient manner.

6 Claims, 15 Drawing Figures

TAPE CARTRIDGE POSITIONING AND EJECTION DEVICE

The present invention relates to a magnetic tape recording and reproduction apparatus and more particularly, to a positioning and ejection device for a magnetic tape cartridge or cassette incorporated in such a tape recording and reproduction apparatus.

Recently, tape recorders of cartridge-loading type have come into general use because of the simplicity in loading and removing the magnetic tape from the apparatus. In such known tapes of cartridge or cassette type, the magnetic tape is normally stored on one of the two reels housed in the cartridge for carrying the tape past a recording or reproduction magnetic head onto the second reel during operation. Upon transfer of the tape onto the second reel during playing of one track, the tape cartridge removed from the apparatus may be reversed for playing a second track as the tape is transferred back onto the first reel.

In the known arrangement as described above, it is necessary for the tape cartridge inserted into the apparatus to be correctly positioned for engagement with driving system of the apparatus such as capstan, pinch roller, tape transfer and control spindles and the like in such a manner that the capstan, for example, penetrates the cartridge to engage the tape for driving the same tape past the magnetic heads, while the tape transfer and control spindles enter the reel hubs of the cartridge to provide tensioning for the supply reel and driving force to the take-up reel.

Figure 1:
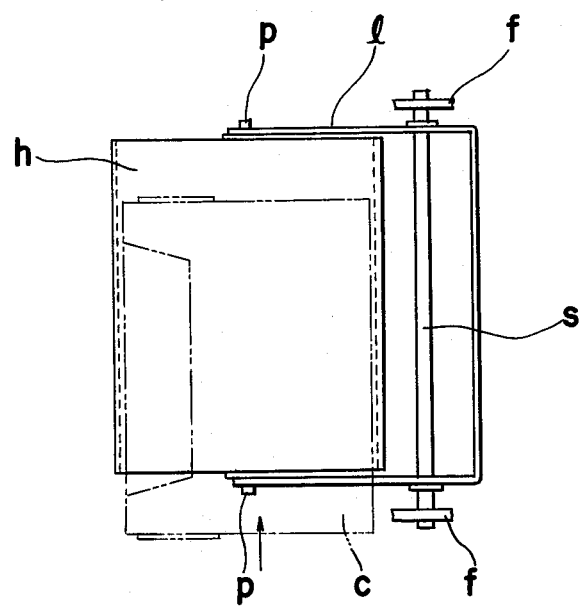
Figure 2A:
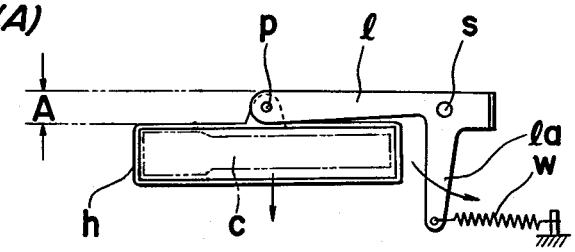
Figure 2B:
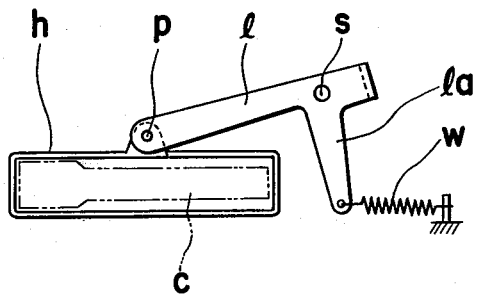

Conventionally, in the tape recording and reproduction apparatus of a type in which the tape cartridge is inserted, from its short side edge, into the apparatus, with subsequent lowering of the cartridge from the inserted position to the playing position, there has been proposed an arrangement as shown in FIGS. 1 to 2(B), wherein the tape cartridge $c$ of known construction is horizontally inserted, with its one short side edge directed forward, into a cartridge holder $h$ held in a raised position (FIG. 2(A)) and having rectangular cross section corresponding to that of the cartridge $c$ for subsequent lowering of the cartridge $c$, through downward movement of the holder $h$, into the playing position as shown in FIG. 2(B). In such conventional construction, the cartridge holder $h$ for receiving the cartridge $c$ therein is pivotally supported through brackets extending upwardly from central portions of opposite upper side edges thereof with pins $p$ by a corresponding lever member $l$. The lever member $l$ is fixedly mounted on a shaft $s$ rotatably supported by frames $f$ of the apparatus and is positioned by suitable retaining means (not shown) at a first position for cartridge insertion (FIG. 2(A)) against the tension of the spring $w$ connected between the lower end of an extension $la$ of the lever $l$ and frame (not shown) of the recording and reproduction apparatus. Upon releasing the lever member $l$ from the retaining means, the holder $h$ containing the cartridge $c$ therein is lowered, by the action of the spring $w$ and the rotation of the lever member $l$ together with the shaft $s$, to the second position for playing (FIG. 2(B)).

The known arrangement as described above, however, has various disadvantages in that, since the cartridge holder $h$ has a box-like configuration in which the cartridge $c$ is entirely accommodated, rather complicated processes are involved in the manufacture of such holders, thus resulting in reduction of working efficiency and consequent high cost. Furthermore, from the viewpoint of construction, a space A as shown in FIG. 2(A) is required for connection of the cartridge holder $c$ with the pivotal lever $l$ through the pins $p$, which arrangement increases the number of parts involved, thus the recording and reproduction apparatus tending to be complicated with increased possibilities of malfunction and resultant large size, and is not suitable for adoption in the compact sized apparatus. Meanwhile, in the conventional ejection mechanism for the cartridge $c$ after completion of playing, similar disadvantages are inherent from structural point of view, thus adversely affecting simplification, stable function and compact size of the recording and reproduction apparatus itself.

Accordingly, an essential object of the present invention is to provide a tape cartridge positioning and ejection device for incorporation in a magnetic tape recording and reproduction apparatus wherein a rack and pinion combination is employed to cause a movement of a crank member for effecting positioning of the tape cartridge at the insertion, and ejection of the same when necessary with efficient manner.

Another important object of the present invention is to provide a tape cartridge positioning and ejection device of the above described type which is simple in construction and stable in functioning, with substantial elimination of disadvantages inherent in the conventional tape cartridge positioning and ejection devices.

A further object of the present invention is to provide a tape cartridge positioning and ejection device of the above described type which is compact in size and can be incorporated into a tape recording and reproduction apparatus of a small size.

According to a preferred embodiment of the present invention, the tape cartridge positioning and ejection device of the invention includes a frame member of U-shaped cross section for inserting the tape cartridge therein pivotally disposed along one side of a horizontal passage in a tape cartridge recording and reproduction apparatus for selective movements between raised and lowered positions, a rack lever having a rack and a claw which engages a reel hub opening of the tape cartridge upon insertion of the tape cartridge into the frame member, with the rack lever being adapted to move along the horizontal passage in a first direction for cartridge insertion against tension of a first spring which urges the rack lever in a second direction opposite to the cartridge insertion direction, a pinion gear in mesh with the rack of the rack lever, a crank lever pivotally connected at its one end to an eccentric point of the pinion gear and a second spring connected between the other end of the crank lever and a cartridge ejection means. The rack lever is adapted to move in the first direction upon insertion of the tape cartridge into the frame member for rotating the pinion gear to a slight degree in one direction so as to cause crank motion of the crank lever through tension of the second spring, and the pinion gear further moves the rack lever in the first direction for cartridge insertion in an attracted manner through the crank motion to bring the tape cartridge into a fully inserted position, with associated pivotal movement of the frame member to the second position for cartridge recording and reproduction. The second spring for the crank lever is adapted to lose its tension through depression of the cartridge ejection means for rotating the pinion gear in the other direction so as to return the rack lever in the second direction through the tension of the first spring, with associated pivotal movement of the frame member to the first position for ejection of the tape cartridge, by which arrangement, a cartridge positioning and ejection device of simple construction and compact size having high mechanical reliability is presented, with substantial elimination of disadvantages inherent in the conventional devices of the kind.

These and other objects and features of the present invention will become apparent from the following description taken in conjunction with the preferred embodiment thereof with reference to the attached drawings in which;

FIGS. 1, 2(A) and 2(B) are explanatory schematic views of the conventional devices of which content has already been described hereinbefore.

Figure 3:
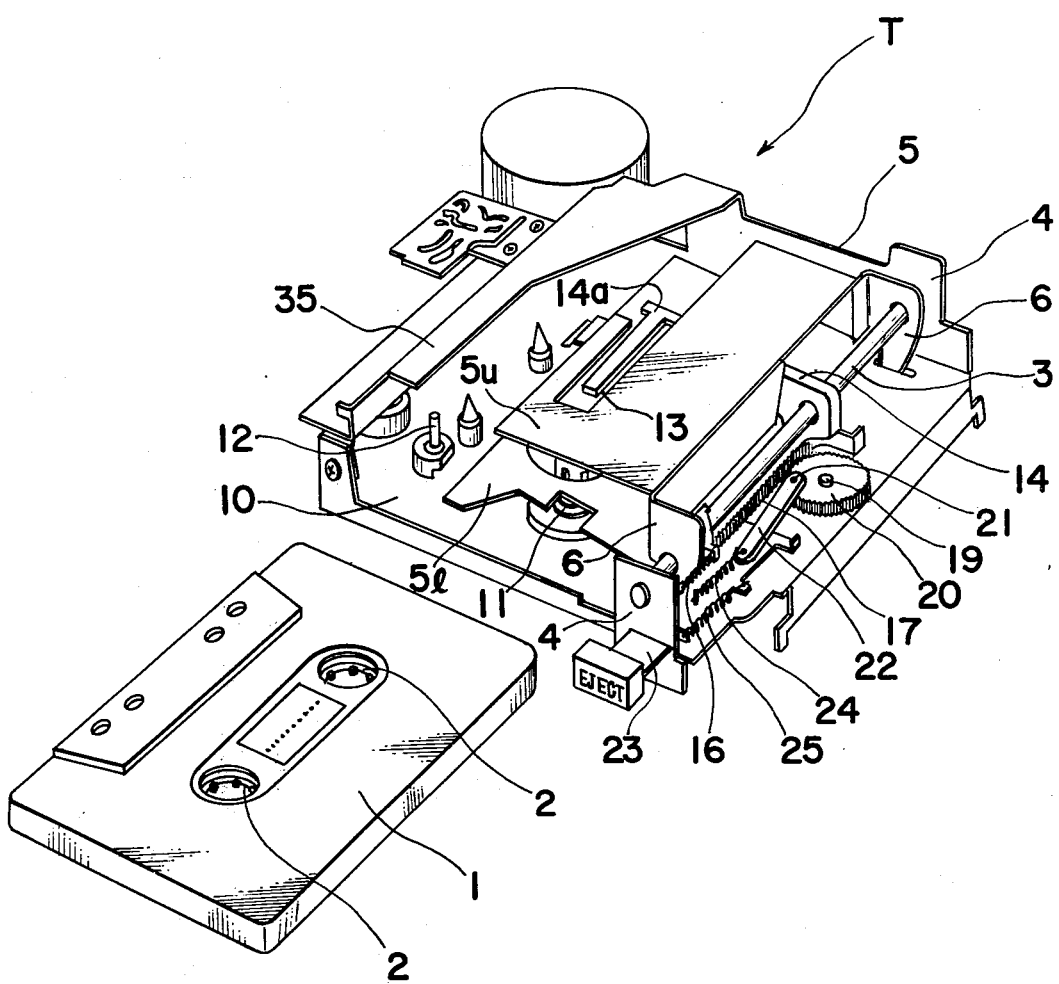
Figure 4:
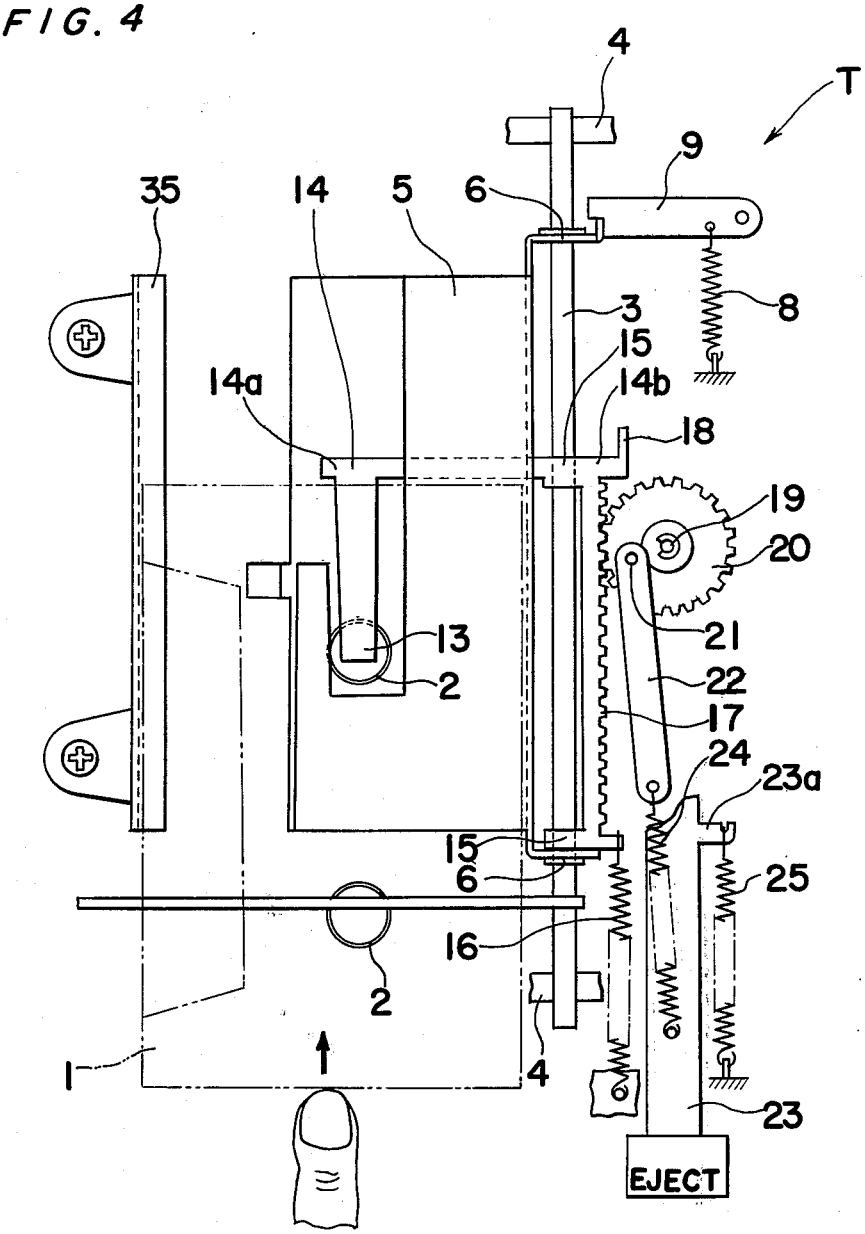
Figure 5:
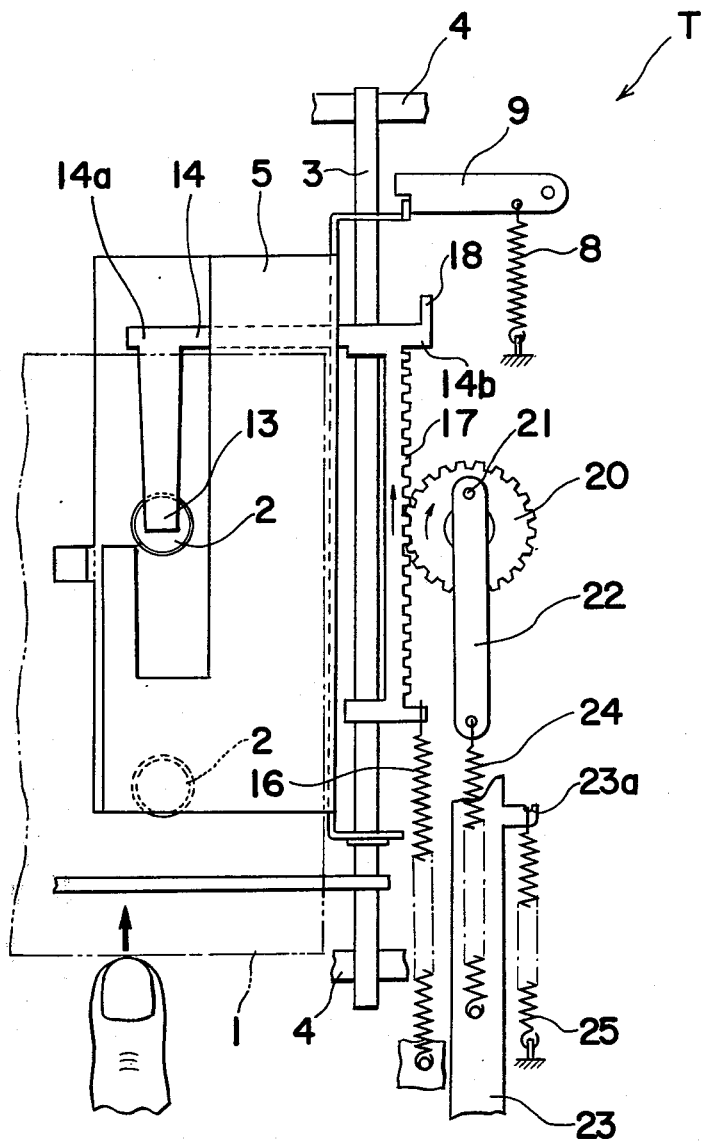
Figure 6:
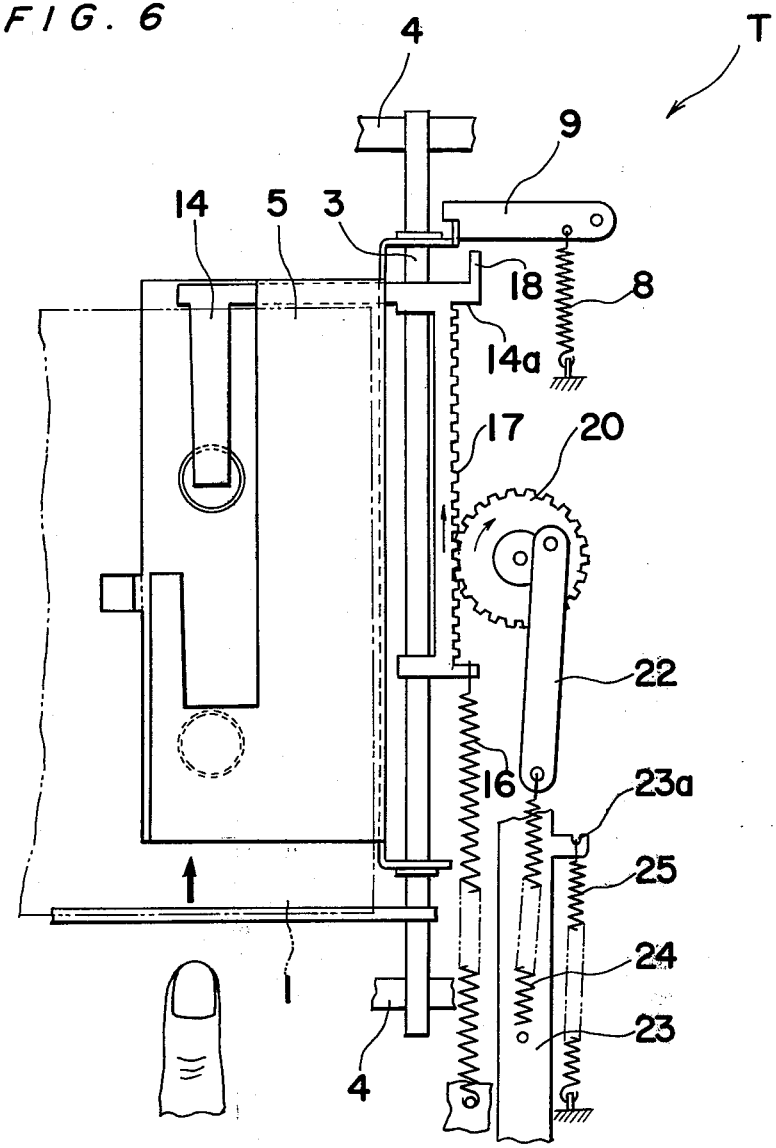

FIG. 3 is a perspective view of a tape cartridge positioning and ejection device according to one embodiment of the present invention with the tape cartridge removed therefrom, FIGS. 4 to 6 are schematic top plan views of a tape cartridge positioning and ejection device of the present invention, sequentially showing different positions of a tape cartridge during insertion, with associated arrangements of a recording and reproduction apparatus being removed for clarity.

Figure 7:
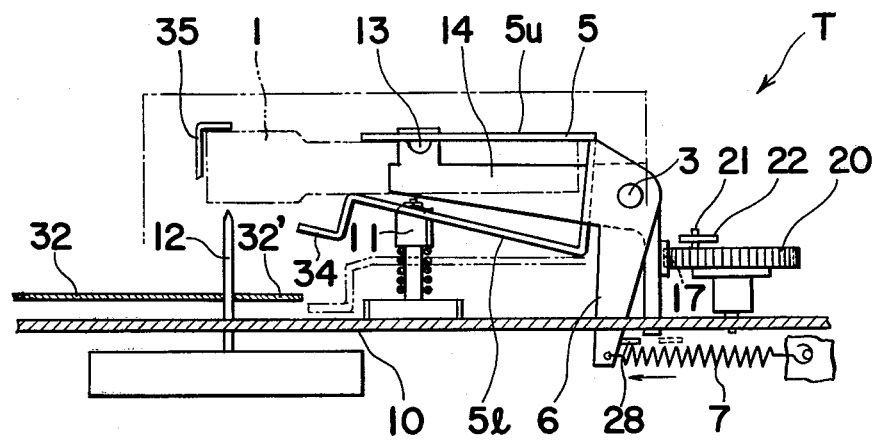
Figure 8A:
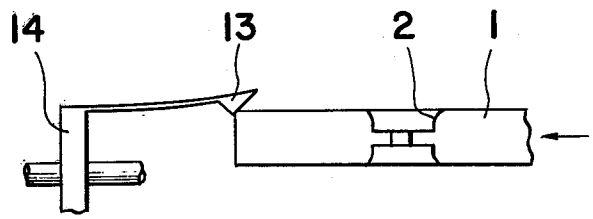
Figure 8B:
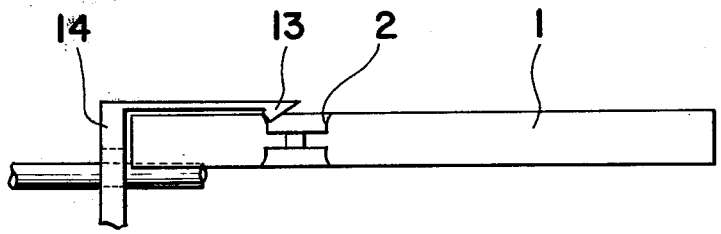
Figure 9:
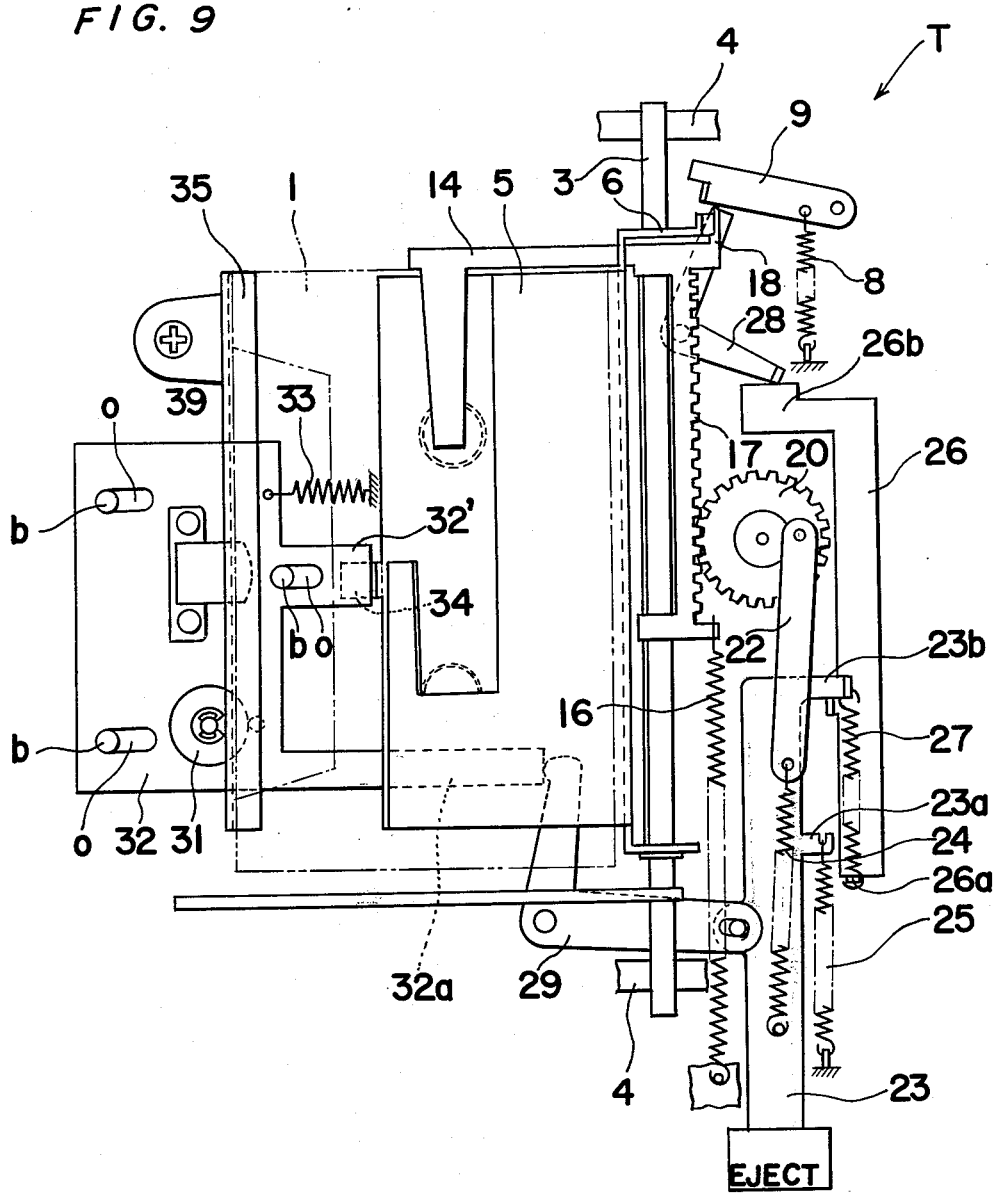
Figure 10:
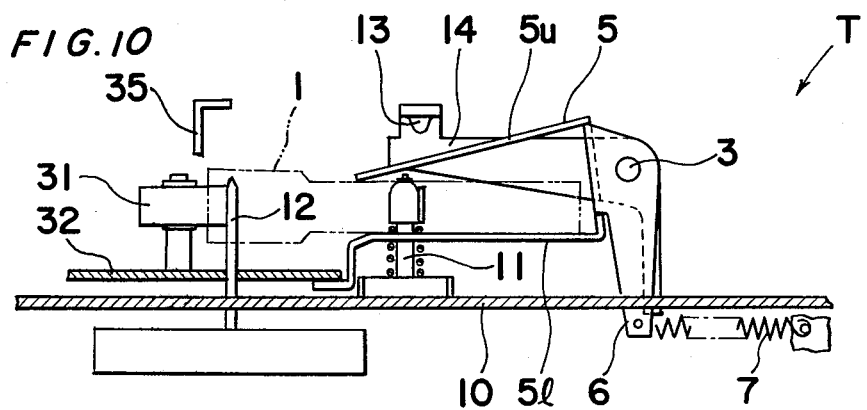
Figure 11:
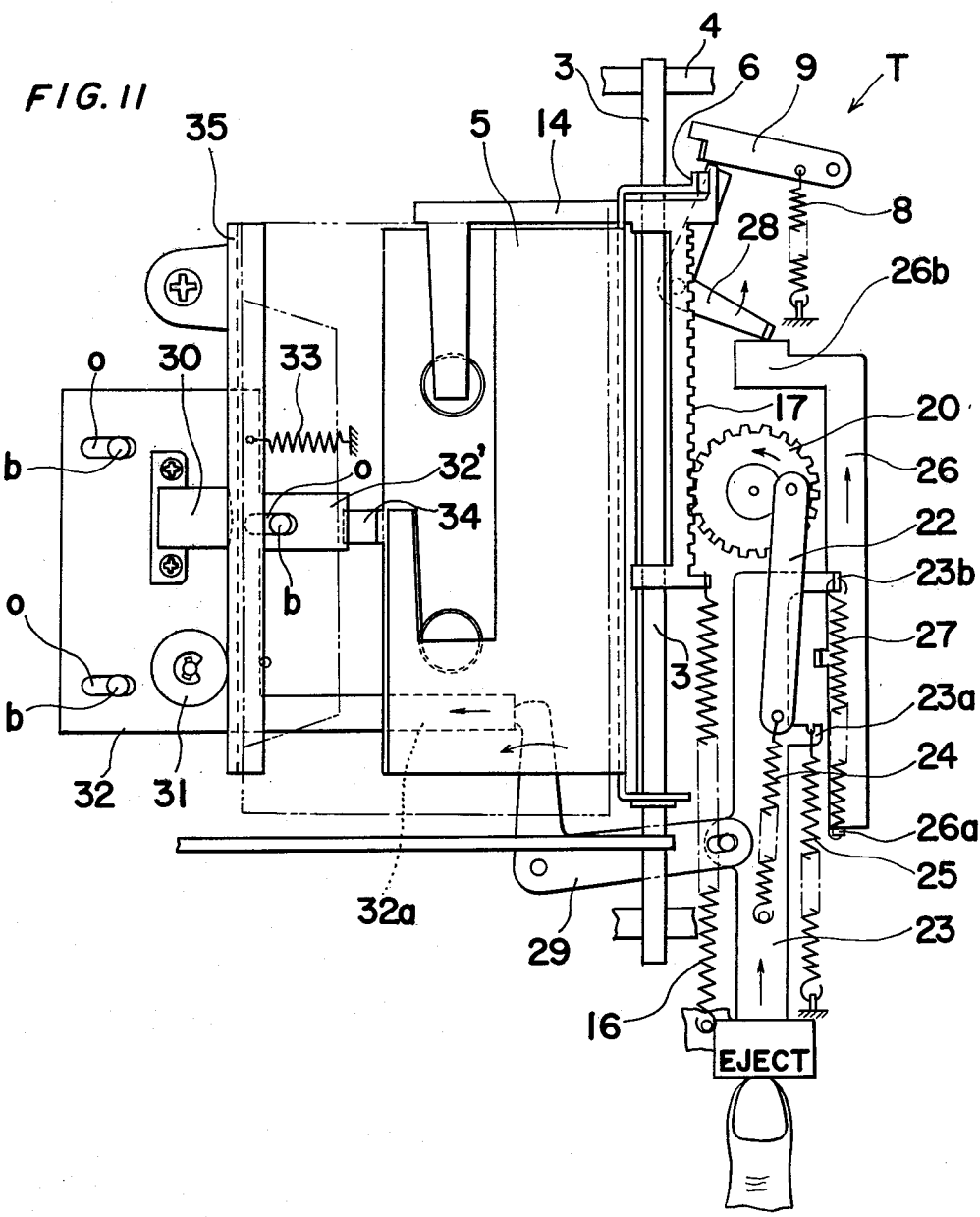
Figure 12:
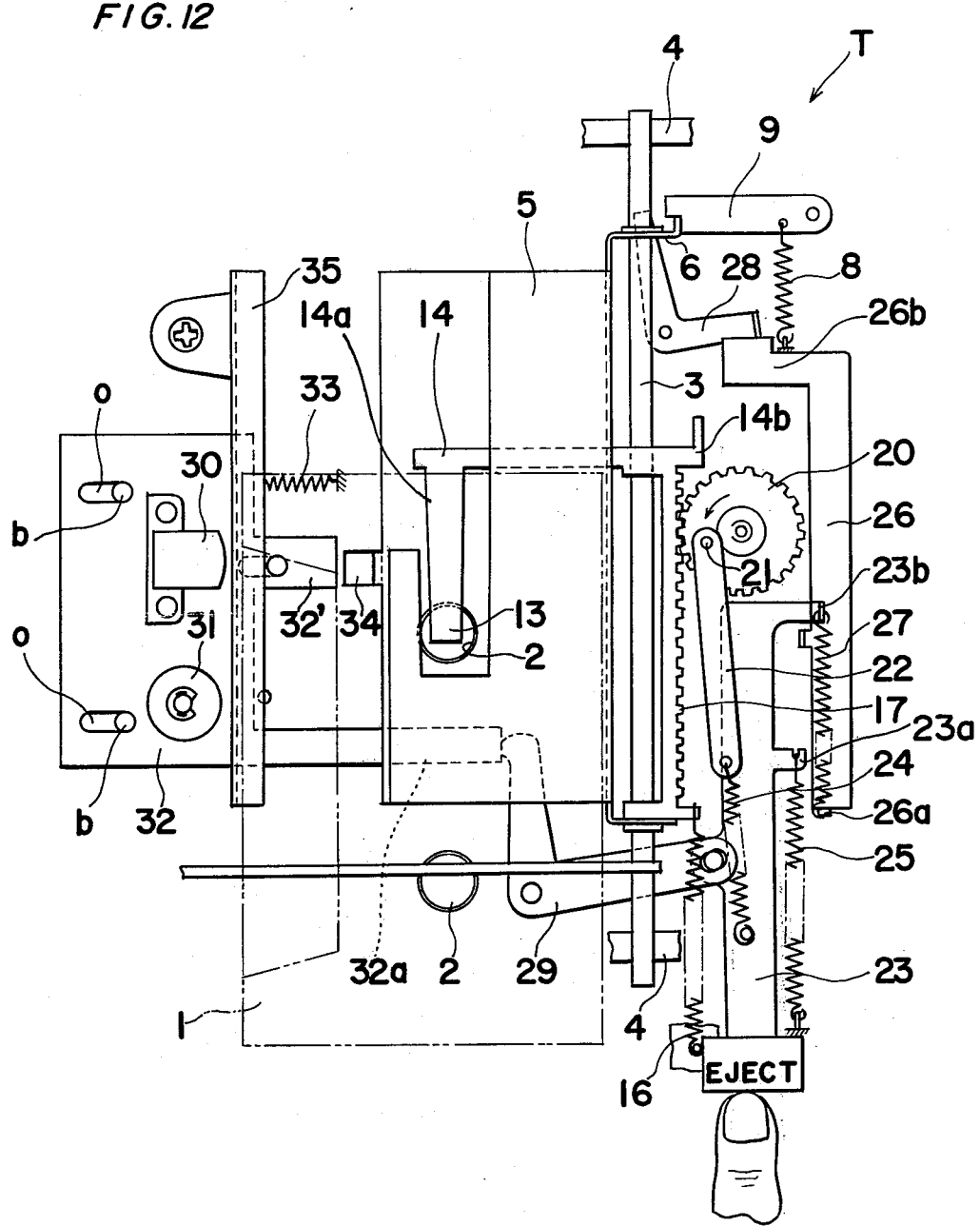
Figure 13:
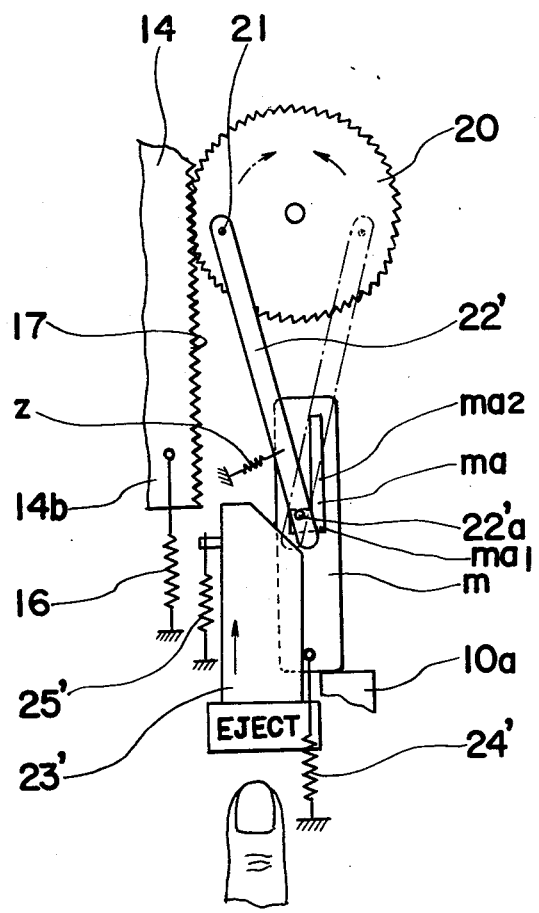

FIG. 7 is a schematic side elevational view, partly in section, of the device of FIGS. 4 to 6, with a frame member held in a raised position for selective cartridge insertion or ejection, FIGS. 8(A) and 8(B) are fragmentary side views showing relation between a claw of a rack lever and an opening of a reel hub of the tape cartridge, FIG. 9 is a similar view to FIGS. 4 to 6, but particularly shows the tape cartridge in a fully inserted position, FIG. 10 is a similar view to FIG. 7, but particularly shows the frame member in a lowered position ready for recording and reproduction of the tape cartridge, FIGS. 11 and 12 are similar views to FIG. 9, but particularly show sequentially different positions of the tape cartridge during ejection, and FIG. 13 is a fragmentary top plan view showing a modification of the tape cartridge ejection arrangement of FIGS. 3 to 12.

Before the description of the present invention proceeds, it is to be noted that like parts are designated by like reference numerals throughout several views of the attached drawings.

Referring now to FIGS. 3 through 12, there is shown in FIG. 3 a magnetic tape positioning and ejection device T according to one embodiment of the present invention. The device T includes a guide shaft 3 which extends in a direction parallel to that of the insertion of a tape cartridge 1 of known construction having a pair of reel hubs 2 and which is fixedly supported at opposite ends thereof by corresponding support frames 4. A frame member or cartridge holder 5 having approximately U-shaped cross section (FIG. 7) for holding therein about a half of the cartridge 1 at its right hand portion is rotatably mounted on the guide shaft 3 through a pair of leg portions 6 extending outwardly and downwardly from the corresponding right side edges of the frame member 5.

It should be noted here that the distance between an upper wall $5u$ and a lower wall $5l$ of the frame member 5 is gradually narrowed toward the front side edges, i.e., toward side edges thereof remote from the leg portions 6, whereat the distance therebetween is equal to the thickness of the tape cartridge 1 for smooth insertion of the cartridge. The frame member 5 is normally urged to rotate downward by a spring 7 connected between the lowermost end of one of the leg portions 6 and a pin fixed to the frame of the apparatus (not shown), but is maintained at a raised position against the force of the spring 7 as in FIG. 7 by the engagement of the other of the leg portions 6 thereof with a notch formed at one end of a lock lever 9 which is pivoted at the other end to the frame of the apparatus and is normally urged to rotate counterclockwise by a spring 8 connected between the lock lever 9 and the frame (not shown) of the apparatus.

It should be noted here that the raised position of the frame member 5 shown in FIG. 7 whereat the upper wall $5u$ thereof is held horizontal allows the tape cartridge 1 to be inserted horizontally into the frame member 5 without any obstruction by reel spindles 11 rotatably mounted on a chassis 10 or by the capstan 12, while in the lowered position of the frame 5 (FIG. 10) whereat the lower wall $5l$ thereof is brought into a horizontal position, the cartridge 1 held in the frame member 5 is adapted to perfectly engage the reel spindles 11, capstan 12 and the like which penetrate the cartridge 1 at corresponding positions, thus the cartridge 1 being ready for recording or reproduction.

On the guide shaft 3, a rack lever 14 having a base portion $14b$ provided with a rack 17 on one side edge thereof which extends in a direction parallel to the guide shaft 3 and a generally L shaped extension $14a$ is slidably mounted at opposite end portions 15 of the base portion $14b$ so as to be movable in the direction of insertion of the cartridge 1, with a downward projection or claw 13 being provided at the extreme end of the L-shaped extension $14a$ for engagement with one of the reel hubs 2, while a return spring 16 is connected between one end of the base portion $14b$ and a pin fixed to the chassis 10 of the device T for urging the lever 14 in a direction opposite to that of the insertion of the cartridge 1. The base portion $14b$ of the rack lever 14 is further provided, at the other end thereof, with a projection 18 which is adapted to engage the lock lever 9 for releasing the lever 9 from the engagement thereof with the leg portion 6 of the frame member 5. The rack 17 of the rack lever 14 meshes with a pinion gear 20 rotatably provided through a shaft 19 on the chassis 10, while a crank lever 22 is pivotally connected, at one end thereof, to an eccentric point on the gear 20 by a pin 21, with the other end of the crank lever 22 being connected through a spring 24 to a pin fixed on an actuating lever 23 for cartridge ejection. The spring 24 is so arranged as to exert tension to urge the rack lever 14 in a direction opposite to that of the cartridge insertion when the actuating lever 23 is not depressed, but to lose its tension when the lever 23 is depressed, with a return spring 25 being connected between a projection $23a$ formed at approximately central side edge of the lever 23 and a projection on the chassis 10. Between the actuating lever 23 and the lock lever 9 and adjacent to the pinion 20, there is movably disposed an intermediate lever 26 of L shape in a direction parallel to the guide shaft 3 (FIGS. 9 to 12), which lever 26 is connected to the actuating lever 23 through a spring 27 extended between a projection $26a$ at one end of the lever 26 and a projection $23b$ formed at an extreme end of the lever 23. The portion $26b$ of the lever 26 laterally extending at right angles to the axis of the same lever 26 is adapted to engage one end of another small L-shaped lift lever 28 pivoted to the chassis 10 to rotate the lever 28 which is also adapted to engage at the other end thereof with the leg portion 6 of the frame member 5 for rotating the frame 5 back to the original raised position against the force of the spring 7 and for subsequently causing the notch of the lock lever 9 to engage with the leg portion 6 of the frame 5 to retain the frame 5 in the raised position. At the left hand portion of the device T (FIGS. 9 to 12), there is disposed a rectangular base plate 32 on which a magnetic head 30 and a pinch roller 31 are mounted, which base plate 32 is adapted to be laterally displaceable through pins b fixed on the chassis 10 and engaging elongated openings o formed in the plate 32, and is normally urged toward the frame member 5 or the cartridge 1 through a spring 33 connected between the plate 32 and the chassis 10. Between the base plate 32 and the actuating lever 23, there is pivotally disposed another L-shaped intermediate lever 29 which has an elongated opening, at its one end engaging a pin fixed at an approximately central portion of a side edge of the actuating lever 23 and which engages at the other end thereof with an extension 32a of the plate 32 for moving the base plate 32 in a direction away from the frame member 5 against the force of the spring 33. It should be noted that the base plate 32 laterally displaceably disposed on the chassis 10 is adapted to move toward the frame 5, i.e., toward the cartridge 1 when the frame member 5 is directed downward so that another extension 32' of the plate 32 engages a bent projection 34 formed in the central portion of the lower left edge of the frame member 5. Above the base plate 32, there is disposed a guide plate 35 of L-shaped cross section in a direction parallel to the guide shaft 3 for guiding and engaging the left side edge of the cartridge 1 when the frame member 5 is rotated upwardly toward the raised position thereof.

By the above arrangement, when the cartridge 1 is to be inserted, from its short side edge portion, into the frame member 5 as shown in FIG. 4, the frame member 5 is held in its raised position as in FIG. 7, in which condition, as the cartridge 1 is horizontally pushed into the frame member 5, for example, by a finger, the projection or claw 13 of the rack lever 14 is brought from the state shown in FIG. 8(A) into engagement with one of the openings of the reels hubs 2 of the cartridge 1 (FIG. 8(B)), with the rack lever 14 which is pushed by the cartridge 1 being simultaneously moved along the guide shaft 3 against the tension of the return spring 16 in a direction shown by an arrow in FIG. 5. Accordingly, the pinion gear 20 in mesh with the rack 17 of the lever 14 is caused to rotate clockwise, and consequently, the crank lever 22 eccentrically pivoted at its one end to the pinion 20 is displaced to a position shown in FIG. 5 against the force of the spring 24, in which position, the rotational center 19 of the pinion gear 20 is in alignment with the eccentric pivotal point 21 of the crank lever 22, with the spring 24 being extended to provide maximum tension. If the point 21 of the lever 22 is moved any further from this position, the crank lever 22 is subjected to crank motion by the tension of the spring 24 for further rotating the pinion 20 clockwise. Therefore, the rack lever 14 whose claw 13 is in engagement with the opening of the one of the reel hubs 2 brings the cartridge 1 into the predetermined inserted position through the rack 17 thereof which engages the pinion 20, even when the pushing by the finger is suspended after initial depression on the cartridge 1. By the above forward movement of the rack lever 14 assisted by pulling action by the crank mechanism, the lock releasing projection 18 of the rack lever 14 strikes against the lock lever 9 to rotate said lock lever 9 against the urging force of the spring 8, thus the frame member 5 being released from its raised position in FIG. 7 and directed downward as shown in FIG. 10 by the action of the spring 7, in which lowered position of the frame 5, the cartridge 1 held within the frame member 5 is correctly positioned for operation, with the capstan 12 and the reel spindles 11 penetrating the corresponding portions of the cartridge 1. After the cartridge 1 is attached to the correct position in the above described manner, the base plate 32 having the magnetic head 30 and the pinch roller 31 mounted thereon is caused to advance by the action of the spring 33 toward the cartridge 1 through actuating means (not shown). For ejecting the cartridge 1 set in position as described above out of the device T, the actuating lever 23 is depressed as shown in FIG. 11 against the force of the spring 25, and the base plate 32 for the magnetic head 30 and pinch roller 31 is caused to move leftward away from the cartridge 1 against the force of the spring 33 through the intermediate lever 29, while the spring 24 connected between the actuation lever 23 and the crank lever 22 loses its tension, with simultaneous displacement of the intermediate lever 26 in the direction of the arrow (FIG. 11) through the action of the spring 27 to rotate the lift lever 28 counterclockwise, which lift lever 28 in turn pushes the leg portion 6 of the frame member 5 in the direction of the arrow in FIG. 7 against the tension of the spring 7, thus the frame member 5 returning to its original raised position (FIG. 7), with consequent engagement of the leg 6 with the notch of the lock lever 9 for retaining the frame member 5 in said raised position. In the above state, since the pull of the spring 24 exerted on the crank lever 22 is lost as mentioned earlier, the pinion gear 20 together with the crank lever 22 rotates counterclockwise by the action of the return spring 16 for the rack lever 14, with consequent returning movement of the rack lever 14 along the guide shaft 3 as shown in FIG. 12, and thus the cartridge 1 whose reel hub opening 2 is in engagement with the claw 13 of the rack lever 14 is ejected from the frame member 5.

Referring now to FIG. 13, there is shown a modification of the tape cartridge ejection arrangement of FIGS. 3 to 12. In this modification, the rack lever 14 having the rack 17 is urged in the direction opposite to that of the cartridge insertion through the return spring 16 connected between one end of the base portion 14b of the lever 14 and the chassis 10 in the similar manner as in FIGS. 3 to 12, while the spring 24 described as connected between the other end of the crank lever 22 and the actuating lever 23 is dispensed with, and a pin 22a' secured at the other end of the crank lever 22' is slidably received in an L-shaped groove ma of an intermediate plate m which is movably disposed between the pinion 20 and a frame 10a of the chassis 10. A spring Z is connected between the portion of the lever 22' immediately above the pin 22a' and a suitable portion of the chassis 10 for urging the crank lever 22' to one side of the groove ma, while the intermediate plate m is normally urged, by a spring 24' connected between one end of the plate m and the chassis 10, in a direction opposite to that of the cartridge insertion. It should be noted here that the spring 24' has a tension larger than the spring 16 which urges the rack lever 14 and consequently the rack 17 in the same direction as that of the plate m. The actuating lever 23 for ejection in the FIGS. 3 to 12 is replaced by an actuating lever 23' whose one end adjacent to the other end of the crank lever 22' having the pin 22a' is tapered as shown for engagement with said other end of the crank lever 22', while the actuating lever 23' is also urged in the same direction as those of the rack lever 14 and the intermediate plate m by a spring 25' connected between a projection formed at a forward side edge of the lever 23' and the chassis 10. In the above arrangement, when the actuating lever 23' is depressed against the tension of the spring 25' in the direction of an arrow for the tape cartridge ejection, with the crank lever 22' located in a position shown in a chain line, the tapered forward edge of the lever 23' is pressed against the side edge of the other end of the crank lever 22' whose pin 22a' is engaged with a lateral base portion ma1 of the L-shaped groove ma of the plate m, and the pin 22a' disengaged from the base portion ma1 is subsequently led into the longitudinal portion ma2 of the groove ma, with the tension of the spring 24' being lost, thus the rack 17 and consequently the rack lever 14 being returned to the original position by the action of the spring 16. Other constructions and functions of the device T are similar to those of FIGS. 3 to 12, so that detailed description thereof is abbreviated for brevity.

As is clear from the foregoing description, according to the tape cartridge positioning and ejection device of the invention, the cartridge is correctly inserted and placed in the predetermined recording and reproducing position in the device, while the same cartridge is readily ejected out of the device through depression of the actuating lever, with the simple construction of the device contributing much to stable functioning and reduction in manufacturing cost. Furthermore, in the tape cartridge positioning and ejection device of the invention, since the frame member for holding the cartridge is formed to have the U-shaped cross section unlike the conventional cartridge holder of box-like configuration, while the known arrangement wherein the cartridge holder is moved vertically upward or downward is replaced by rotational movement of the frame member about the guide shaft for causing the upper inner surface and lower inner surface of the frame member to selectively cooperate with the corresponding upper and lower surfaces of the cartridge. The tape cartridge can be held perfectly horizontal in the frame member both in the raised and lowered positions of the frame member, and simultaneously the spaces adjacent to the upper and lower surfaces of the frame member are effectively utilized for positive insertion and ejection of the cartridge, thus the cartridge positioning and ejecting device particularly suitable for incorporation in small sized recording and reproducing apparatuses being presented through simple construction.

Although the present invention has been fully described by way of example with reference to the attached drawings, it is to be noted that various changes and modifications are apparent to those skilled in the art. Therefore, unless otherwise such changes and modifications depart from the scope of the present invention, they should be construed as included therein.

What is claimed is:

1. A tape cartridge positioning and ejection device for use in a magnetic tape recording and reproduction apparatus of a type wherein a tape cartridge loaded along a horizontal passage into the apparatus is selectively moved between a first position for insertion and ejection of the tape cartridge and a second position for recording and reproduction thereof, said tape cartridge positioning and ejection device comprising;

a frame member for receiving the tape cartridge therein pivotally disposed along one side of the horizontal passage for selective movements between said first and second positions, a rack lever member having a rack and claw means which engages a reel hub opening of the tape cartridge upon insertion of the tape cartridge into said frame member, said rack lever member being moved along said horizontal passage in a first direction by insertion of the tape cartridge against tension of a first spring means which normally urges said rack lever member in a second direction opposite to said first direction, a pinion gear in mesh with the rack of said rack lever member, a crank lever member pivotally connected at one end thereof to an eccentric point on said pinion gear, and a second spring means having tension larger than that of said first spring means for urging said crank lever member in said second direction, said rack lever member being moved in said first direction by insertion of the tape cartridge into said frame member thereby rotating said pinion gear a predetermined degree in one direction to bring said crank lever member into crank motion through tension of said second spring means, said pinion gear further moving said rack lever member in said first direction in an attracted manner through said crank motion to bring the tape cartridge into a fully inserted position, frame locking means providing associated simultaneous pivotal movement of said frame member to said second position upon said full insertion, cartridge ejection means reduce the tension of said second spring means thereby rotating said pinion gear in the other direction to return said rack lever member in said second direction through the tension of said first spring means, with associated simultaneous pivotal movement of said frame member to said first position for ejection of the tape cartridge.

2. A tape cartridge positioning and ejection device as claimed in claim 1, wherein said second spring means is connected between the other end of said crank lever member and said cartridge ejection means.

3. A tape cartridge positioning and ejection device as claimed in claim 1, wherein said second spring means is associated with said cartridge ejection means through an intermediate plate member having a groove formed therein for slidable engagement with a pin member which is secured at the other end of said crank lever member.

4. A tape cartridge positioning and ejection device as claimed in claim 1, wherein said frame member is provided with upper and lower walls and a pair of leg portions which are pivotally supported on a guide shaft disposed adjacent and in parallel relation to the one side of said horizontal passage, with a guide plate member being fixedly disposed at the other side of said horizontal passage for guiding the tape cartridge during said pivotal movement of said frame member between said first and second positions about said guide shaft, said upper wall of said frame member being held horizontal at said first position, with inner surface of said upper wall contacting one surface of the tape cartridge for holding the tape cartridge between said upper and lower walls, said lower wall of said frame member being held horizontal at said second position, with inner surface of said lower wall contacting the other surface of the tape cartridge for allowing the tape cartridge held between said upper and lower walls of said frame member to be ready for selective recording and reproduction.

5. A tape cartridge positioning and ejection device as claimed in claim 1, wherein said cartridge ejection means includes an actuating lever member movably disposed in a direction parallel to said one side of said horizontal passage and normally urged in a direction opposite to that of the cartridge insertion by a third spring means, with said second spring means which is connected at one end thereof to said other end of said crank lever member being connected at the other end thereof to said actuating lever member, said frame locking means includes an intermediate lever member also movably disposed in a direction parallel to said actuating lever member and connected at one end thereof to said actuating lever member through a fourth spring means, and a lift lever member pivotally disposed between the other end of said intermediate lever member and one of said leg portions of said frame member, the other end of said intermediate lever member being adapted to contact one end of said lift lever member to rotate said lift lever member for causing the other end of said lift lever member to push the one of said leg portions for rotating said frame member to said first position to effect said associated simultaneous pivotal movement of said frame member.

6. A tape cartridge positioning and ejection device as claimed in claim 5, said frame locking means further including a lock lever member pivotally disposed adjacent to the one of said leg portions and normally urged to said one of said leg portions by a fifth spring means so as to engage said one of said leg portions when said frame member is in said first position for locking said frame member thereat, said rack lever member being provided at one end thereof corresponding to said one of said leg portions with a projection which engages said lock lever member when said rack lever member has reached said fully inserted position of said tape cartridge so as to disengage said lock lever member from said one of said leg portions for allowing said frame member to rotate to said second position.

* * * * *